United States Patent [19]

Nakashima

[11] 4,140,636
[45] Feb. 20, 1979

[54] SLUDGE SUPPLYING DEVICE FOR FILTER PRESS

[75] Inventor: Hiromasa Nakashima, Tajimi, Japan

[73] Assignee: NGK Insulators Ltd., Nagoya, Japan

[21] Appl. No.: 891,177

[22] Filed: Mar. 29, 1978

[30] Foreign Application Priority Data

Apr. 26, 1977 [JP] Japan .................................. 52-52246

[51] Int. Cl.² ..................... B01D 25/12; B01D 25/04; B01D 25/08
[52] U.S. Cl. ................................... 210/224; 210/225; 210/227; 100/196
[58] Field of Search ............... 100/194, 196, 197, 198; 210/224, 225, 226, 228, 229, 230, 231, 456, 541, 542, 227

[56] References Cited

U.S. PATENT DOCUMENTS

| 218,879 | 8/1879 | Hartshorn | 100/197 |
|---|---|---|---|
| 569,920 | 10/1896 | Hubbell | 100/194 |
| 570,491 | 11/1896 | Mitchell | 100/196 |
| 2,932,399 | 4/1960 | Emele | 210/225 |
| 3,826,601 | 7/1974 | Hutter | 425/338 |
| 3,968,039 | 7/1976 | Inujima et al. | 210/225 |

*Primary Examiner*—Frank A. Spear, Jr.
*Assistant Examiner*—David R. Sadowski
*Attorney, Agent, or Firm*—Stevens, Davis, Miller & Mosher

[57] ABSTRACT

A sludge supply device for a single type filter press, wherein a sludge feeding nozzle is fitted in a recess in a side wall of a filter plate, with a filter cloth interposed therebetween, comprising a sludge supply pipe connected to said sludge feeding nozzle and at least two supporting rods carrying said sludge supply pipe and pivotally mounted on a retaining means attached to the side wall of the filter plate, said retaining means, said sludge supply pipe and said at least two supporting rods constituting a parallelogrammatical link mechanism, thereby maintaining said sludge feeding nozzle in a generally constant direction during the movement thereof. This invention facilitates the discharge of cake removed from the filter cloths and ensures smooth travelling of each filter cloth and easy washing thereof.

5 Claims, 4 Drawing Figures

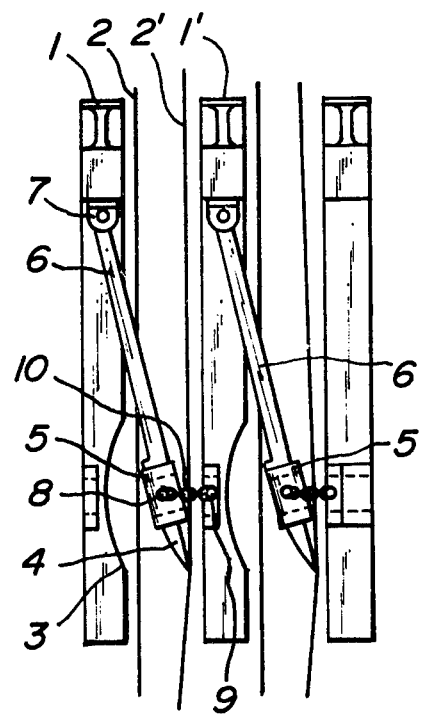
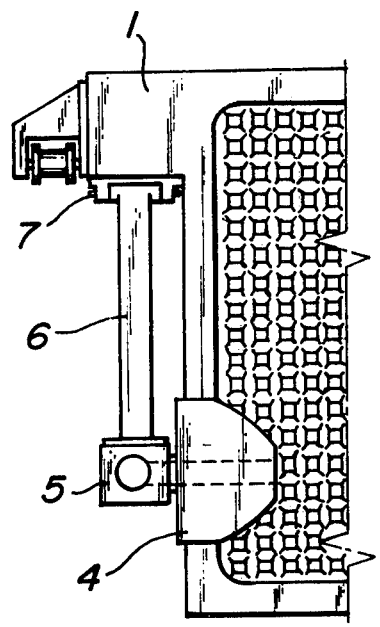
FIG. 1
FIG. 2 a# SLUDGE SUPPLYING DEVICE FOR FILTER PRESS

BACKGROUND OF THE INVENTION

This invention relates to a sludge supplying device for a single type filter press, wherein a sludge feeding nozzle adapted to be fitted in a recess in the side wall of each filter plate so as to feed a sludge between the neighboring filter plates is maintained in a generally constant direction during the movement thereof and even after the filter plates have been opened, thereby facilitating the discharge of cake removed from the filter cloths, the travelling of each filter cloth and the washing thereof.

Generally for a filter-cloth travelling type, single type, filter press, there is prevailingly used a sludge supplying device of the type in which a sludge feeding nozzle is adapted to be fitted in a recess in the side wall of each filter plate, with a filter cloth interposed therebetween. A prior art sludge supplying device is typically shown in FIGS. 1 and 2. In this device, a sludge feeding nozzle 4 is inserted between two filter cloths 2 and 2' from one side thereof, each of which is strained between. A prior art sludge supplying device of this type shown in FIGS. 1 and 2. In this device, a sludge feeding nozzle 4 is inserted between two filter cloths 2 and 2', the two cloths being strained between filter plates 1 and 1'. The nozzle 4 is adapted to be fitted in a recess 3 in the side wall of each filter plate 1 or 1', and connected integrally to a sludge supply pipe 5. The sludge supply pipe 5 is connected to a separation pin 9 attached to filter plate 1' adjacent to filter plate 1 by a separation means 10 such as a chain. With such a sludge supply device, when filter plates 1 and 1' are respectively shifted to an open position after termination of the dehydrating operation, sludge supply pipe 5 is pulled by separation means 10, as filter plate 1' is shifted to an open position, to cause a pivotal movement about pivot pin 7, of support arm 6, whereby the sludge supply pipe is positioned substantially at a mid portion between filter plates 1 and 1'. At this juncture, sludge feeding nozzle 4, because of being integral with support arm 6, assumes a tilted posture relative to the filter cloths, as shown in FIG. 1, thus resulting in the impingement of cake on the nozzle when the cake is discharged through the neighboring filter cloths 2 and 2', or an unwanted contact of filter cloths 2 and 2' with the nozzle upon travelling and washing thereof, leading to a break in the filter cloths.

Where a sludge feeding nozzle 4 of a flat, vertically elongated shape is used to provide an improved sealing effect, even a small angle of pivotal movement of support arm 6 is magnified into a large amplitude at the top and bottom tips of nozzle 4, which causes the nozzle to strongly contact a travelling filter cloth, leading to an expedite break both in the nozzle 4 and filter cloths 2 and 2'. If the spacing between the neighboring filter plates is increased, with a view to preventing a contact of sludge feeding nozzle 4 with filter cloths 2 and 2', an increased over-all length of the filter press and a reduced filtering area per unit floor space would be bound to result. Such is undesirable for the sludge supply device, particularly for use in a filter-cloth travelling type, single type, filter press.

SUMMARY OF THE INVENTION

It is accordingly an object of the present invention to provide a sludge supply device, wherein a sludge supply pipe having a sludge feeding nozzle is supported by a parallelogrammatical link mechanism, whereby the sludge feeding nozzle may be generally maintained in a constant direction during the movement thereof.

To attain this object, there is provided according to the present invention a sludge supply device in which a sludge supply pipe connected to a sludge feeding nozzle is supported by at least two supporting rods pivotally supported on a retaining means, which in turn is rigidly secured to a side surface of a filter plate. The sludge feeding nozzle is retained usually in a constant direction by a parallelogrammatical link mechanism formed by a combination of the retaining means, sludge supply pipe and two supporting rods.

BRIEF DESCRIPTION OF THE DRAWINGS

FIGS. 1 and 2 are explanatory views of a prior art sludge supply device for a filter press.

DESCRIPTION OF PREFERRED EMBODIMENTS

Figure 3:
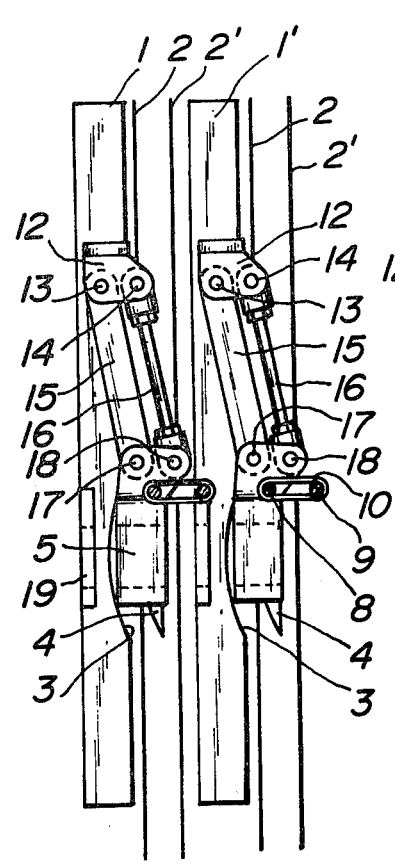
FIGS. 3 and 4 are explanatory views of a sludge supply device according to the present invention.
Figure 4:
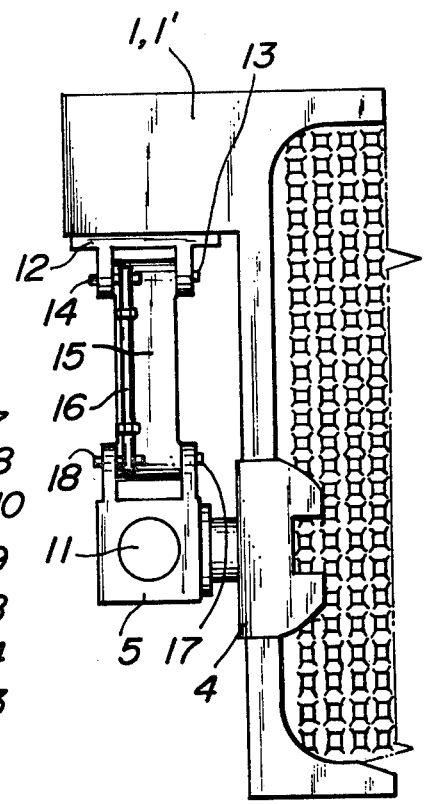

Referring to FIGS. 3 and 4, a sludge feeding nozzle 4 for supplying a sludge is fitted in a recess 3 in a side wall of each filter plate 1 or 1', with a filter cloth 2' interposed therebetween. A sludge supply pipe 5 has a sludge passage 11 having an opening communicating with sludge feeding nozzle 4. Sludge supply pipe 5 is suspended by two supporting rods 15 and 16 vertically extending, preferably in parallel relation to each other, and pivotally supported by pins 13 and 14 on a retaining means 12, which in turn is attached to the side wall of each filter plate 1 or 1'. Supporting rods 15 and 16 and sludge supply pipe 5 are connected to each other in such a manner that a parallelogrammatical link mechanism is formed by the sludge supply pipe 5 between pins 17 and 18, the retaining means 12 between pins 13 and 14, and the two supporting rods 15 and 16 between pins 13 and 17 and between pins 14 and 18, respectively. Preferably, sludge supply pipe 5 is connected by a separation means 10 is a given size to the filter plate succeeding to the filter plate to which the pipe is attached.

While the two supporting rods 15 and 16 forming the link mechanism may be equal in dimension to each other, one supporting rod may alternatively be smaller in dimension. Two or more supporting rods may be used, so long as a parallelogram is formed between respective pairs of pins. Sludge supply pipe 5 may be so arranged as to be brought into pressure-contact with projecting portions 19 of the neighboring filter plates, with its sludge passage aligned with those of projecting portions, thereby providing substantially a continuous sludge passage 11, when filter plates 1 and 1' are brought into a close position, as shown in FIG. 3, or may be connected to a sludge header pipe by way of a flexible hose communicating with the tip of the nozzle.

While supporting rods 15 and 16 preferably support sludge supply pipe 5 in a pendent fashion, these supporting rods may be provided below the sludge supply pipe 5 so as to support it from that lower position.

It is preferable that the length, i.e., the pin-to-pin distance, of one of supporting rods 15 or 16 be adjustable.

With the arrangements so far described, according to the present invention, sludge feeling nozzle 4 for supplying a sludge between the neighboring filter plates is generally maintained in a constant direction during the movement thereof by means of the parallelogrammatical link mechanism. This facilitates the discharge of cake through the neighboring filter plates when the filter plates are opened and eliminates the likelihood of the nozzle contacting filter cloths, thus ensuring a smooth travelling of filter cloths. The sludge supply device according to the present invention is particularly suited for use in a filter-cloth travelling type, single type filter press, and hence applicable to the industrially basis.

What has been described should be construed as explaining the principle of the invention and various changes and modifications may be made by those skilled in the art within the spirit and scope of the invention and appended claims.

What is claimed is:

1. A sludge supply device for a single type filter press, wherein a sludge feeding nozzle is arranged as to be fitted in a recess in a side wall of a filter plate, with a filter cloth interposed therebetween; comprising;

a sludge supply pipe connected to said sludge feeding nozzle; and at least two supporting rods carrying said sludge supply pipe and pivotally mounted on a retaining means attached to the side wall of the filter plate;

said retaining means, said sludge supply pipe and said at least two supporting rods constituting a parallelogrammatical link mechanism, thereby maintaining said sludge feeding nozzle in a generally constant direction during the movement thereof.

2. A sludge supply device as defined in claim 1, wherein a projecting portion is provided on each filter plate, and the sludge supply pipe is brought into pressure-contact with the projecting portions of the neighboring filter plates when filter plates are brought into a close position, thereby providing substantially a continuous sludge passage.

3. A sludge supply device as defined in claim 2, wherein the sludge supply pipe is connected by way of a flexible hose to a sludge header pipe.

4. A sludge supply device as defined in claim 1, wherein one of said at least two supporting rods is adjustable in length.

5. A sludge supply device as defined in claim 1, wherein said sludge supply pipe is connected by a separation means to the filter plate succeeding the filter plate to which said pipe is attached.

* * * * *